Oct. 10, 1961 A. L. M. A. ROUY ET AL 3,003,939
METHOD AND APPARATUS FOR PRODUCING AND ENHANCING CHEMICAL
REACTION IN FLOWABLE REACTANT MATERIAL
Filed Aug. 31, 1955 8 Sheets-Sheet 1

INVENTORS:
AUGUSTE L.M.A. ROUY
CHARLES H. PETERSON
GREEN B. GLASSCOCK
BY Howson & Howson
ATTYS.

3,003,939
Patented Oct. 10, 1961

3,003,939
METHOD AND APPARATUS FOR PRODUCING AND ENHANCING CHEMICAL REACTION IN FLOWABLE REACTANT MATERIAL
Auguste L. M. A. Rouy, Scarsdale, N.Y., and Charles H. Peterson and Green B. Glasscock, Erie, Pa., assignors to Lord Manufacturing Company, Erie, Pa., a corporation of Pennsylvania
Filed Aug. 31, 1955, Ser. No. 531,626
11 Claims. (Cl. 204—164)

This invention relates to enhancement of chemical reactions which are produced by passing reactant material through an electrical discharge having an optimum reaction zone determined by the electric field intensity existing within said zone. The expression "reactant material," as used herein and in the claims, is intended to mean any material in gaseous or vaporous form, and any association of materials, at least one of which is in gaseous or vaporous form. Thus, the expression includes suspensions or dispersions of solid or liquid particles in a gaseous or vaporous material.

Chemical reactions in an electrical discharge are produced indirectly by collisions of electrons with molecules and/or atoms of the reactant material, and the optimum reaction zone of the electrical discharge is that zone in which the electron velocities and energies produced by the field are best suited for the production of the desired chemical products.

The field conditions existing within the optimum zone give the best possible field characteristics for an enhancement of the balance between activation mechanism, product formation mechanism, and product destruction mechanism. In the case of product destruction, the lowest possible field strength compatible with adequate activation appears desirable for the preservation of a formed product. The following table demonstrates the general sequence of reaction phenomena as a function of the time variable which is taken from left to right.

| Activation Zone | Product Formation Zone | Product Destruction Zone |
|---|---|---|
| Primary collisions between molecules and atoms with electrons, and secondary interaction between molecules and atoms with light quanta, ions, metastable particles, etc. | Formation of desired products. Formation of undesired products. | Destruction enhanced by high field intensity conditions, long residence time in discharge, and contact with activated particles. |

The principal object of this invention is generally to enhance or improve the production of chemical reactions in any electrical discharge having an optimum reaction zone.

We have discovered that the efficiency and productivity of such reactions can be greatly improved by imparting to the flowing reactant material controlled interrelated pressure, temperature and velocity (hereinafter designated PTS) characteristics in predetermined relation to the optimum reaction zone of the electrical discharge, said optimum reaction zone being a function of the field intensity existing therein. More particularly, we have discovered that such controlled characteristics of the flowing reactant material can be caused to enhance or favor a desired reaction and to suppress undesired reactions.

These results are achieved, according to the present invention, by utilizing a venturi or converging-diverging nozzle section (sometimes termed "de Laval" nozzles) in the reaction tube in predetermined relation to said optimum zone in the electrical discharge. By the term "venturi or nozzle" is meant a converging-diverging nozzle with a well-rounded throat entrance and an angle of divergence such that no shock wave will develop in the reaction zone under operating conditions imposed. Such section produces controlled interrelated PTS characteristics of the flowing reactant material in coordinated relation to the electrical discharge and particularly the optimum zone thereof. The venturi or nozzle section can be so designed as to produce said controlled interrelated PTS characteristics at either subsonic or supersonic flow conditions.

It should not be assumed that we are considering the effects on competing reactions of pressure, temperature, and velocity as being due wholly to the effects of these variables on the bulk gas phase kinetics and thermodynamics of the various simultaneous reactions. The effects of changes in pressure, temperature, and velocity may, for example, also be related to the relative importance of the wall of the reaction tube upon the competing kinetic procedures. An increase in pressure will, for example, reduce the relative utility of the wall as a kinetic body; if an undesired reaction proceeds favorably at the wall surface, a reduction in pressure would be demanded.

In the production of chemical reactions by effecting flow of reactant material through an electrical discharge, the chemical reactions are indirectly produced by collisions of electrons with molecules and/or atoms which may bring about both product formation and destruction. In practically every instance during product formation, simultaneous reactions tending to give undesired products occur in competition with a reaction tending to give desired products. Pressure, temperature, and velocity of the flowing reactant material have been found to play a very important part as a time function in the production of a desired reaction and the effective suppression of undesired reactions. Velocity of the flowing reactant material in any area or zone of the electrical discharge determines the residence time of the molecules and/or atoms within that zone and thus affects any reaction therein. Velocity also determines rate of product removal, and may be controlled so as to prevent or minimize product destruction. Pressure of the flowing reactant material also directly affects any reaction within an area or zone of the electrical discharge, since the pressure determines the mean free path of the molecules and/or atoms and thus largely determines the number of particle collisions involving electrons, molecules, atoms and surfaces during activation, reaction and destruction. Temperature change as a direct function of pressure change also affects the end result obtained.

Different formation reactions are favored by different PTS conditions, and according to the conditions a desired formation reaction is caused to be favored over undesired competing formation reactions by establishing within the optimum reaction zone a PTS condition that is favorable to the desired reaction.

In the practice of this invention in any particular instance, the optimum relationship between the PTS characteristics of the flowing material and the electrical discharge will be determined by the desired formation reaction and the tendency toward production of undesired formation reactions. By employing a venturi or nozzle section in the reaction tube, a "profile" or PTS characteristics may be imparted to the flowing reactant material in predetermined relation to the field intensity of the optimum zone in the electrical discharge to enhance a desired reaction and to suppress undesired formation reactions. It may be said that the "profile" of the PTS characteristics of the flowing reactant material is prearranged in relation to the "profile" of the electrical discharge. This will be understood more clearly from the subsequent description.

Experience has shown that high velocities and low pressures are in general most conducive to electrical discharge efficiencies. We have specifically found that high velocities and low pressures are particularly effective when used in conjunction with an electric field of decreasing field intensity as disclosed in U.S. Patent No. 2,684,329, issued July 20, 1954, to A. L. M. A. Rouy.

We should emphasize that the Rouy patent designates an optimum discharge zone; the optimum reaction zone designated herein, however, is essentially an optimum activation zone, any resulting products never passing through field intensity as high as those operative during their formation.

We have also discovered that the combination of a venturi section and an electric field of decreasing intensity produces markedly improved conditions for carrying out and controlling reactions in gas discharge systems. By proper choice of the position of the venturi structure in relation to the axial field pattern, we not only provide the desired high levels of gas velocity and low levels of pressure, but we also provide a variable combination of pressure, temperature, and velocity conditions within the discharge zone and along the flow path that can be utilized to selectively influence a number of competing reactions proceeding simultaneously. In its broad sense, therefore, this invention involves the use of venturis and control of their application in regions of fixed voltage gradient, giving optimum activation, or in regions of decreasing voltage gradient providing an exposure, somewhere in the decreasing path, to a region of optimum activation.

In its preferred form, therefore, the present invention provides a novel combination of means for producing an electric field of decreasing intensity in the direction of flow, and a venturi structure arranged in predetermined relation to the field intensity pattern to enhance a desired reaction and suppress undesired reactions.

Reference is now made to the accompanying drawings.

FIGS. 2 to 4 show a venturi or nozzle section designed to provide separate zones of PTS characteristics for experimental purposes only, while FIGS. 5 and 6 show idealized designs utilizing the characteristics shown in FIGS. 2 and 4 respectively. FIGS. 5 and 6 exclude the uniform diameter experimental test section as shown in FIG. 3.

Figure 1:
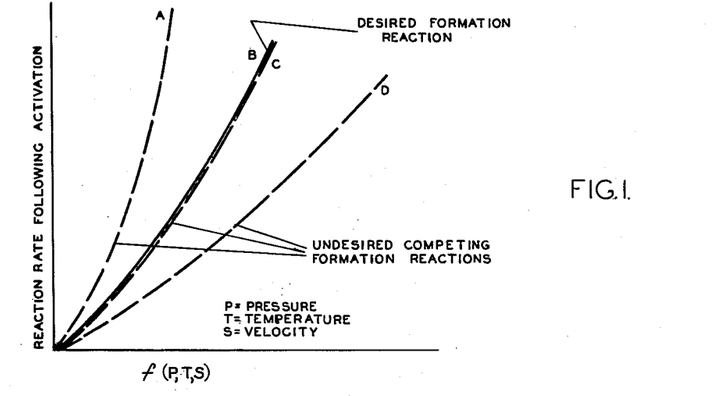
FIG. 1 shows graphically and by way of example reaction rates following activation of desired and undesired reactions under assumed conditions.

Referring first to FIG. 1, it may be assumed that following activation of reactants in a favorable field strength zone, as taught by the aforementioned Rouy patent, a number of reactions can subsequently occur along the decreasing field profile. FIG. 1 shows how the reaction rate may vary, for arbitrary desired and undesired reactions, according to a function of interrelated PTS characteristics, such function being designated by the term $f(P, T, S)$. If the desired reaction has the characteristic B, we may wish to superimpose upon the electric field pattern any of the PTS profiles shown in FIGS. 2 to 6. The choice of PTS profile will depend upon the relative effects of the changes in pressure, temperature and velocity upon the competing reactions having the characteristics A, C, or D in FIG. 1. In FIGS. 2 to 6, the desired PTS profile is obtained by arranging the electrical discharge electrodes in desired relation to the reaction tube which has a venturi or nozzle section.

If the desired competing reaction has the rate characteristic A of FIG. 1, the PTS profile of FIGS. 2 and 5 will be selected. This profile allows the gas to pass through a decreasing field gradient and will establish an $f(P, T, S)$ condition, in the field regions following those effective in optimum activation as taught by Rouy, that will favor the desired reaction B at the expense of competing reaction A, the latter being a reaction that we desire to suppress and that is particularly enhanced by high pressure conditions.

Figure 2A:
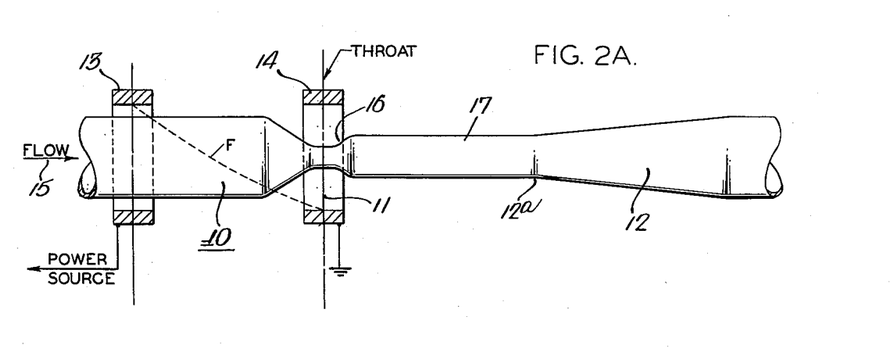
FIGS. 2 to 6 show different relations of the venturi or nozzle section to the electrical discharge, and also show the "profiles" of the electrical discharge and the PTS characteristics imparted to the flowing reactant material. More particularly.
Figure 5A:
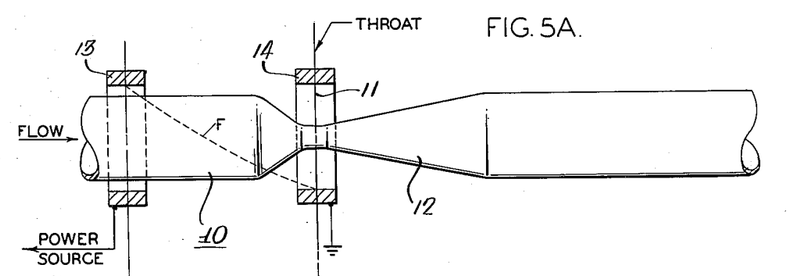

FIGS. 2a and 5a show the reaction tube 10 having a venturi or nozzle section in which the throat is located on the vertical plane 11. In each instance there is a diffusion section 12 following the throat. In FIG. 2a there is a divergent section 16 immediately following the throat, then a uniform diameter section 17, and then the diffusion section 12 starting at 12a. The electrical discharge electrodes 13 and 14 are in the form of axially spaced rings surrounding the reaction tube, as shown and described in the aforementioned Rouy patent. Electrode 13 is connected to a suitable power source (not shown) while electrode 14 is grounded. For example, electrode 13 may be connected to an A.C. source of suitable power and frequency. This arrangement provides an electric field of decreasing intensity or voltage gradient F in the direction of flow indicated by the arrow 15. In the arrangements of FIGS. 2a and 5a, the grounded electrode 14 is located at the throat of the venturi section.

Figure 2B:
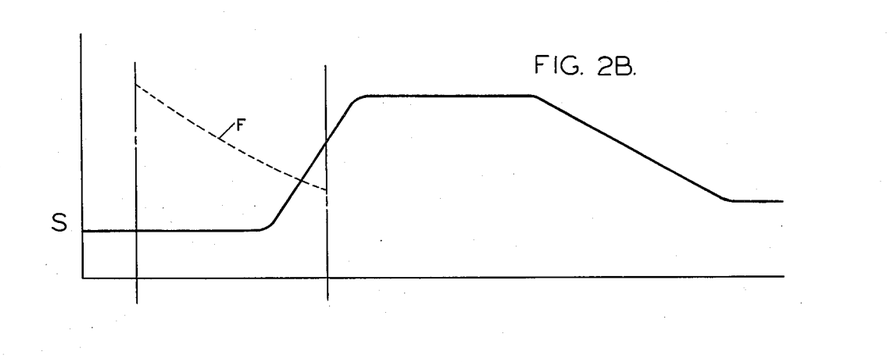
Figure 2C:
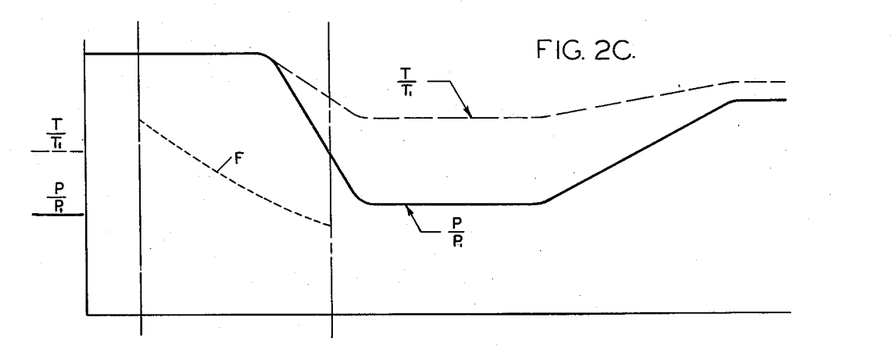
Figure 5B:
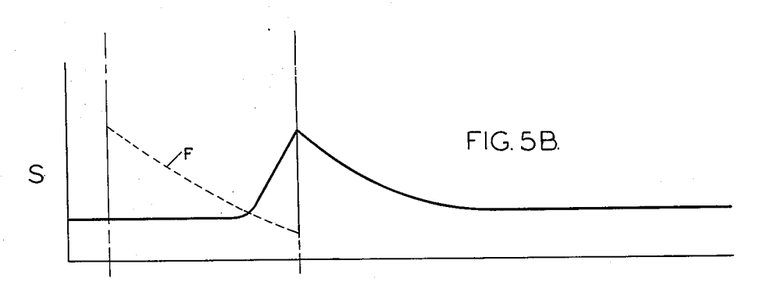
Figure 5C:
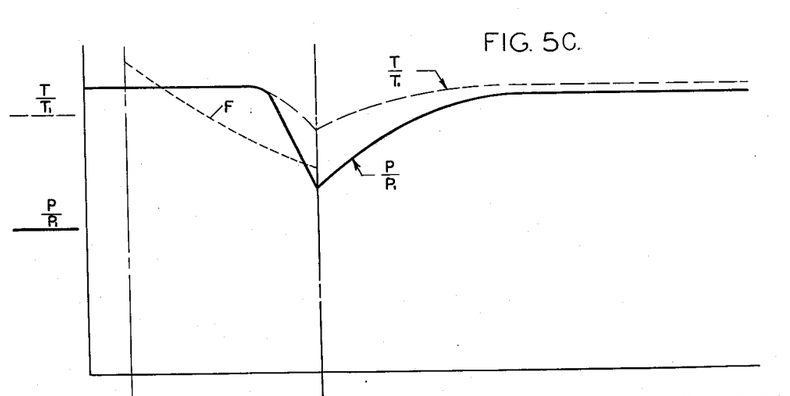

FIGS. 2b and 5b show the velocity characteristic of the reaction tube, while FIGS. 2c and 5c show the pressure and temperature characteristics of the reaction tube. The curves represent flow characteristics in an idealized frictionless venturi or nozzle section. In both instances, the field profile F is included to show the relation between it and the velocity and pressure-temperature profiles.

With the arrangement of either FIG. 2a or FIG. 5a, the velocity is low and the pressure and temperature are high in the higher intensity zones of the electric field, and the velocity increases and the pressure and temperature decrease in the lower intensity portions of the electric field. Thus, the low velocity and high pressure and temperature in the higher intensity zones of the electric field favor activation, and the subsequent increasing velocity and decreasing pressure and temperature in the lower intensity zones of the electric field favor the desired reaction B and tend to suppress the undesired reaction A.

Figure 3A:
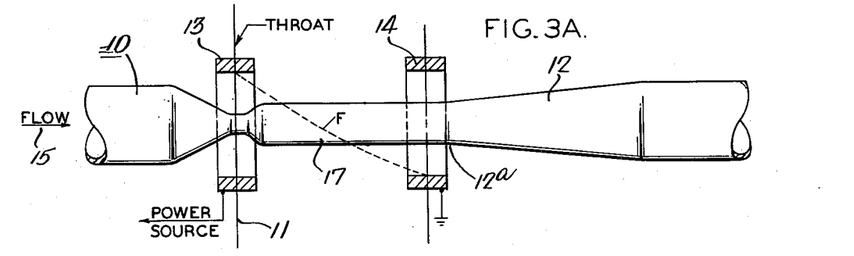
Figure 3B:
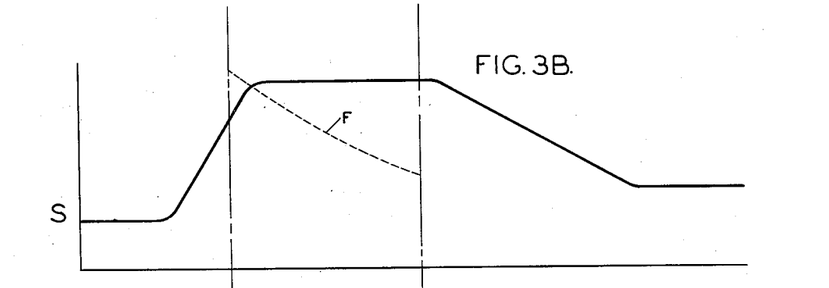
Figure 3C:
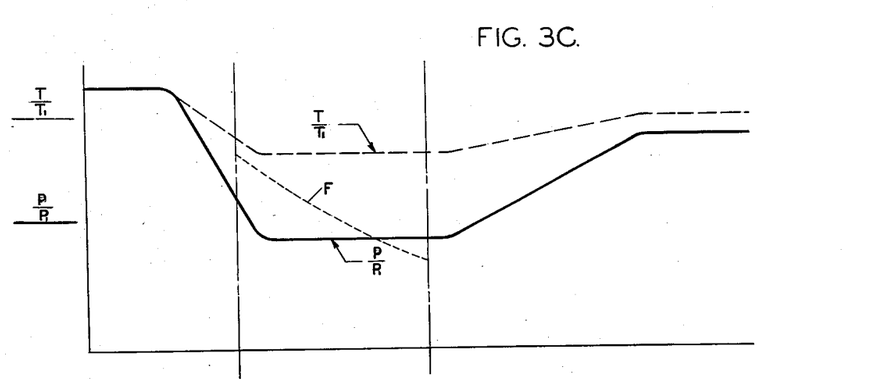

If the undesired competing reaction has the characteristic C in FIG. 1, the arrangement of FIG. 3a may be employed. This type of profile is effective in those reaction systems wherein no great differences between the desired and competing reactions exist as a function of $(P, T, S)$. The usefulness of the venturi is related to its ability to produce the high velocities at low reaction zone pressures and temperatures without seriously imposing unreasonable difficulties in terms of pumping facilities of the flow system. Here the electrodes 13 and 14 are arranged at the opposite ends of the relatively constant low pressure and high velocity zone 17 of the reaction tube 10. Here again, the field intensity is shown at F. As shown in FIG. 3b, this arrangement gives highest possible speed and minimum residence time in all zones of the electric field. As shown in FIG. 3c, this arrangement also gives low pressure for discharge maintenance efficiency.

Figure 4A:
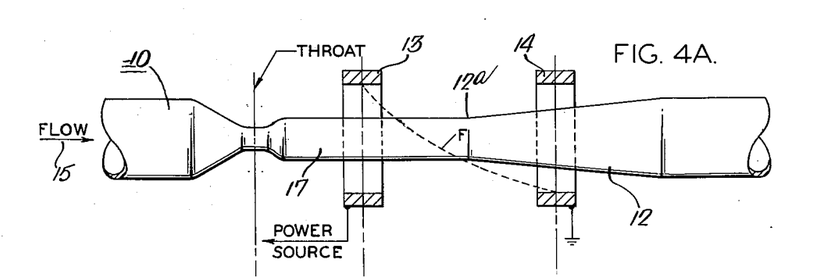
Figure 6A:
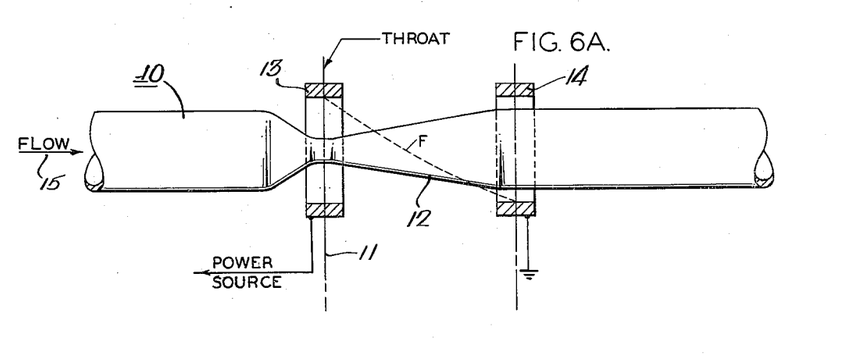

If the competing reaction has the characteristic D of FIG. 1, the arrangement of FIGS. 4a and 6a is employed.

Figure 4B:
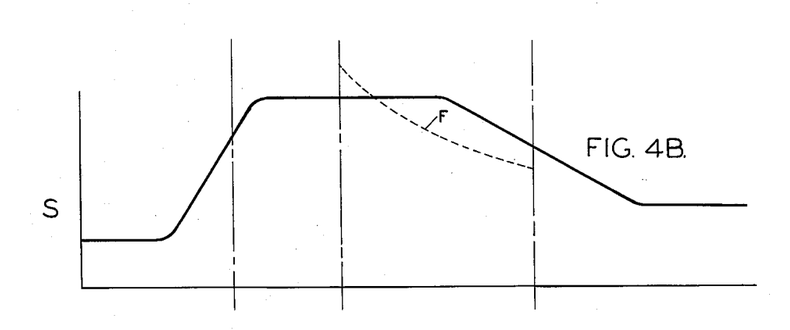
Figure 4C:
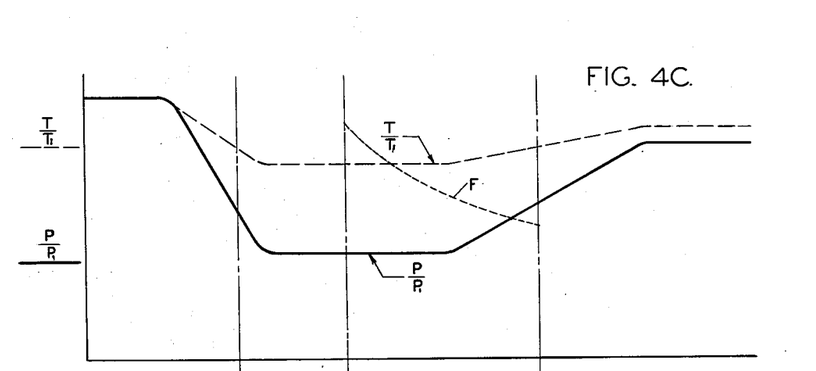
Figure 6B:
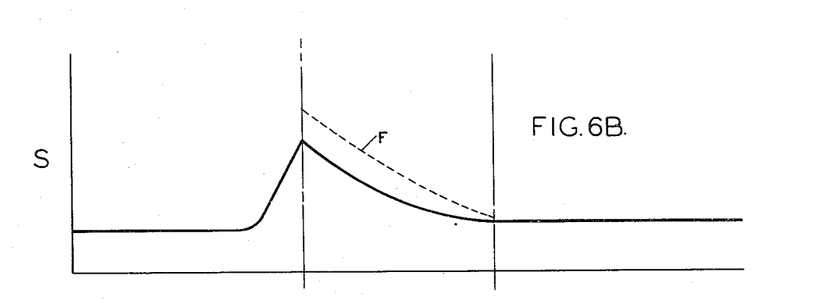
Figure 6C:
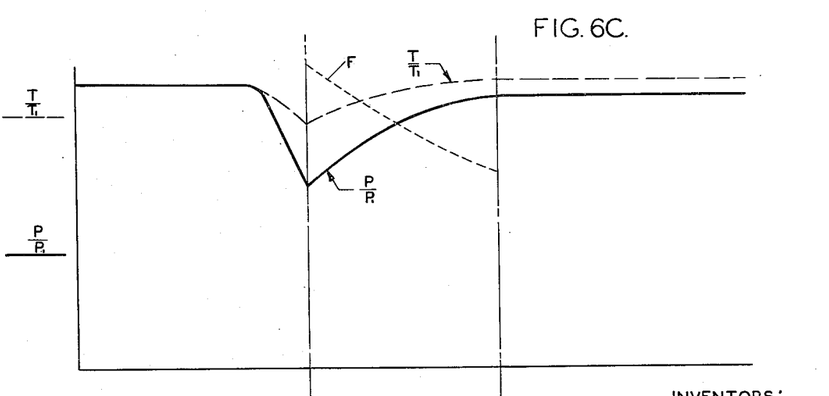

This profile allows the reactant material to pass through a decreasing field intensity and will establish an $f(P, T, S)$ condition, in the field regions following those effective in optimum activation, that will favor the desired reaction B, at the expense of the competing reaction D, the latter being a reaction that is particularly enhanced by low pressure conditions relative to those that favor reaction B. As shown in FIGS. 4b and 6b, the arrangement of either FIGS. 4a or 6a provides short residence time in the higher intensity zones and longer residence time in the lower intensity zones. As shown in FIGS. 4c and 6c, the arrangement also provides relatively low pressure for discharge maintenance, and increasing pressure which enhances recombination. While the undesired reaction D is favored in the higher intensity zone, the decreasing velocity and increasing pressure in the lower intensity zones tend to favor the desired reaction B and to suppress the undesired reaction D.

Figure 7:
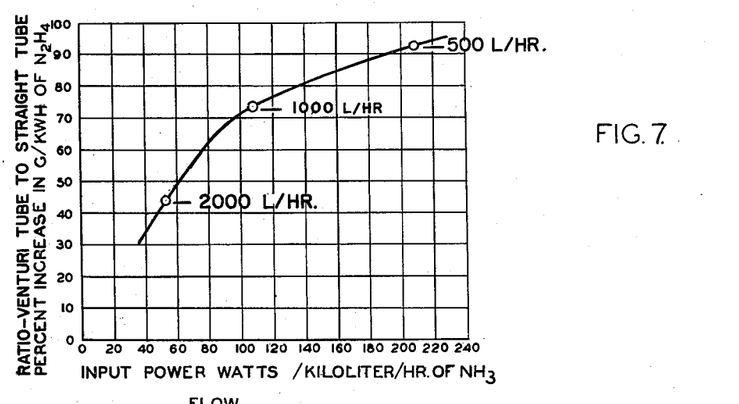
FIG. 7 shows graphically the percent increase in yield of hydrazine from ammonia obtained by utilizing a venturi or nozzle shaped reaction tube as compared with a straight reaction tube of uniform cross section.

In FIG. 7 we show a graphic plot of percent increase in yield obtained utilizing a venturi or nozzle shaped reaction tube vs. a straight reaction tube of uniform cross section. The percent increase in g./kwh. of hydrazine from ammonia is plotted as a function of input power in watts per kiloliter per hour of ammonia. The data from which this curve was plotted was obtained by actual tests. In these tests the inlet pressure was held constant at 55 mm. Hg abs., the mass flow of ammonia was varied in each tube from 500 to 2000 l./hr. S.T.P., and the input power in watts/kiloliter/hr. of $NH_3$ was varied from 52.5 to 214. For this particular reaction (decomposition of $NH_3$ to form $N_2H_4$) the electrodes were placed axially along the venturi tube as illustrated in FIG. 2a. The curve of FIG. 7 clearly demonstrates the utility and advantage of this invention. The ratio of values in FIG. 7 were obtained by dividing the average increase in yield by the average yield in straight tubes and multiplying by 100 to give percentage. Comparison data for apparatus of the present invention employing a venturi tube as compared with apparatus in accordance with the teaching of Rouy employing a straight tube is given below.

[Venturi tube (23 mm. ID inlet section, 7.6 mm. throat, Pyrex venturi)]

| Test No. | Inlet Pressure (mm. Hg Abs.) | Flow Rate, $NH_3$ (Stdl./Hr.) | RF Power Input (Watts) | Yield of $N_2H_4$ (g./kwh.) |
|---|---|---|---|---|
| 755 | 55 | 2,000 | 105 | 7.06 |
| 756 | 55 | 1,000 | 107 | 5.72 |
| 757 | 55 | 500 | 105 | 4.66 |

[Straight tube (23 mm. ID Pyrex tubing)]

| Test No. | Inlet Pressure (mm. Hg Abs.) | Flow Rate, $NH_3$ (Stdl./Hr.) | RF Power Input (Watts) | Yield of $N_2H_4$ (g./kwh.) |
|---|---|---|---|---|
| 758 | 55.0 | 2,000 | 105 | 5.38 |
| 759 | 55.5 | 1,000 | 105 | 3.46 |
| 760 | 55.0 | 500 | 107 | 2.50 |
| 768 | 55.0 | 1,000 | 107 | 3.18 |
| 769 | 54.5 | 2,000 | 107 | 4.37 |
| 771 | 55.0 | 500 | 110 | 2.30 |
| 772 | 55.5 | 1,000 | 105 | 3.24 |

Figure 8A:
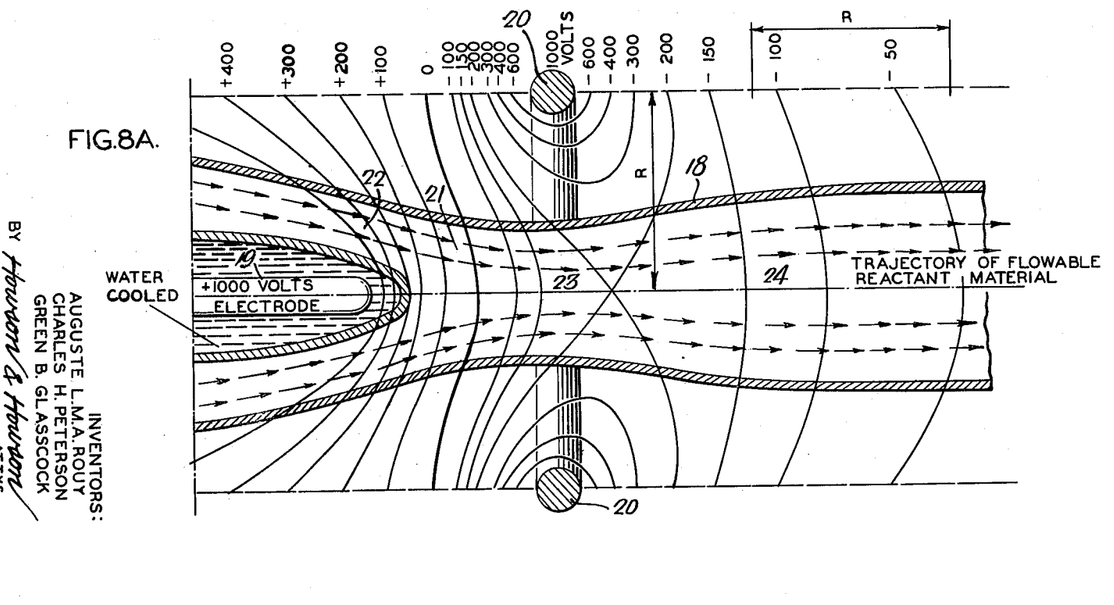
FIG. 8 shows a representative field pattern for a "cold finger" type of electrodeless discharge assembly, and also illustrated the profile of the decreasing field intensity pattern existent axially along the gas trajectory within the venturi or nozzle shaped reaction tube.
Figure 8B:
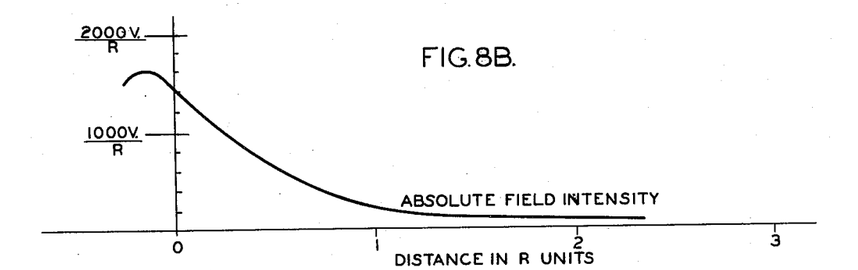

In FIGS. 8a and 8b we have shown a representation of the general character of the field intensity pattern produced by a "cold finger" type of electrode assembly.

FIG. 8a is a plot of the equipotential lines superimposed over a venturi or nozzle shaped reaction tube 18 which might be composed of quartz. The tube is annular in cross section at the initial portion of the venturi section to accommodate the "cold finger" electrode 19. The other electrode is the ring 20. Also shown is the trajectory 21 of the reactant material within said reaction tube, the trajectory being indicated by arrows.

FIG. 8b shows a graphic representation of the absolute field intensity as a function of distance in R units, where R is the radius of the ring electrode. This relationship was chosen to simplify the computations and to permit an easy trans-position of the relative field values.

The field in described by the equipotential lines in FIG. 8a and the field intensity or voltage gradient along the average trajectory 21 of the flowing reactant material is defined by the spacing of the lines.

It is shown by FIGS. 8a and 8b that the flowing reactant material enters a zone of high field intensity at 22. The geometries of the envelope surrounding the "cold finger" electrode (which might be composed of quartz or other suitable material possessing desirable dielectric, temperature, and surface characteristics) and the nozzle shaped reaction tube are chosen so as to create a pressure upstream of zone 22 sufficiently high to prevent pre-ionization. In this example, the flowing reactant material enters said zone 22, which has a field intensity in the order of 1500 volts/R, and flows through zones of a rapidly decreasing field intensity to zone 23 which has field intensity of about 210 volts/R, and then passes out through the very low field intensity zone at 24, a distance R from zone 23.

It is important to note that the above-described field pattern can be varied by changing the spacing of the cold finger electrode in relation to the ring electrode. This is desirable as it provides a means for creating a favorable decreasing field intensity pattern within predetermined zones of optimum PTS characteristics for any particular reaction.

Figure 9:
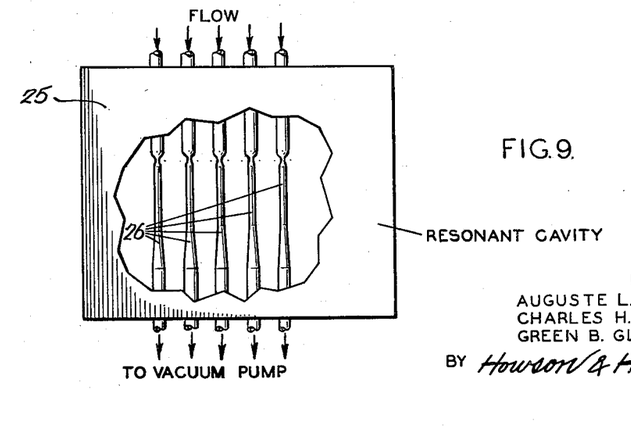
FIG. 9 shows a field creating means in the form of a resonant cavity, with multiple venturi or nozzle shaped reaction tubes inserted in predetermined position within said cavity so as to utilize the preferred or optimum zone of the field pattern therein.

In FIG. 9 we show field creating means in the form of a resonant cavity 25 with multiple venturi or nozzle shaped reaction tubes 26 inserted, in a predetermined position within said cavity so as to utilize the preferred zone of the field pattern therein.

This resonant cavity could be the load tank of an oscillator or other suitable power source and, as is known in the art, the field pattern produced within the cavity can be controlled by proper geometrical design.

The chief advantage of this type of field creating means is that it provides a convenient method and apparatus for simultaneously producing a discharge within each of a bundle or multiplicity of venturi or nozzle shaped reaction tubes as might be required in an electrical discharge plant of commercial size.

Figure 10:
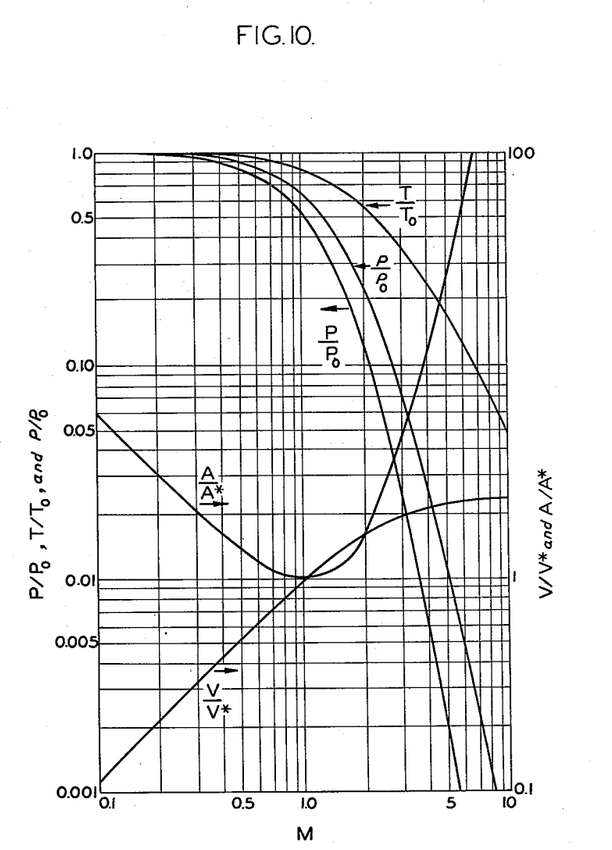
FIG. 10 is a typical plot of various parameters effected by a nozzle against the Mach number of the nozzle.

In FIG. 10 is shown a diagram which is a plot of certain equations as a function of Mach number showing the effect of a nozzle on the various parameters. It has been previously stated that the nozzle or venturi of the present invention is a converging or diverging nozzle with a well-rounded throat entrance and an angle of divergence such that no shock wave will develop in the reaction zone under the operating conditions imposed. This condition is satisfied when the flow is defined by the following equations:

$$T_o/T = 1 + \frac{k-1}{2}M^2$$

$$P_o/P = \left(1 + \frac{k-1}{2}M^2\right)^{\frac{k}{k-1}}$$

$$C_o/C = \left(1 + \frac{k-1}{2}M^2\right)^{\frac{1}{k-1}}$$

$$A/A^* = \frac{1}{M}\left[\left(\frac{2}{k+1}\right)\left(1 + \frac{k-1}{2}M^2\right)\right]^{\frac{k+1}{2(k-1)}}$$

where
$M$ = Mach number
Subsript $o$ designates static parameter
Superscript $*$ designates nozzle throat
$T$ = absolute temperature
$P$ = pressure
$C$ = density
$A$ = cross-sectional area of the nozzle $k$=ratio of specific heat at constant pressure to the specific heat at constant volume of the flowing gas In FIG. 10 these equations are plotted for values when $k=1.4$.

From an analysis of these equations and the diagram it will be seen that for any given set of upstream conditions (i.e. those bearing subscript "$o$") there are two, and only two, exact exit conditions which will not cause shock waves in the nozzle.

The operating parameters of the previously cited example, as applied to the above equations, are as follows:

$T_0=298°$ K.
$P_0=55$ mm. Hg
$A^*=45.6$ sq. mm.
$M$=from approx. 0 in ionization zone to approx. 1.5 in section 16 to approx. 0 in section 12

Referring to the example cited in column 5 of the application and to FIGS. 2a, b, and c, it should be noted that in the experiments used in this illustration the field created by electrodes 13 and 14 represented by F was of sufficient magnitude to ionize and activate the reactant ammonia in the space between the electrodes 13 and 14. The formed activated states and reaction products were rapidly removed from the influence of the discharge through the nozzle throat and diverging section 16 at high speed to a region of low pressure and temperature as indicated by FIGS. 2b and c.

While, as previously stated, the present invention preferably utilizes an electric field of decreasing intensity, as taught by Rouy, it is not limited to such a field condition. Regions of useful and known field intensity are encountered in various zones of different types of discharges—glow, arcs, etc. In a glow discharge, for example, optimum product yield of hydrazine from ammonia occurs in the positive column (Formation of Hydrazine in Electric Discharge Decomposition of Ammonia, John C. Devins and Milton Burton, Journal of the American Chemical Society 76, 2618, 1954). The regions of higher field intensity (cathode region) and of lower field intensity (negative glow and Faraday dark space) appear to be of limited utility in the hydrazine synthesis. The superposition of the desired PST profile on the positive column region of the glow can be utilized to produce improvements in yield of hydrazine.

Conversely, in glow discharge reactions in which the negative glow region is of major importance for optimum yield, e.g. decomposition of methane, the superposition of the desired PST profile on said region can be utilized to produce improvements in yield (Decomposition of Methane in an Electrical Discharge, Hans Wiener and Milton Burton, Journal of American Chemical Society 75, 5815, 1953). The same applies to ammonia synthesis, demonstrated and illustrated by Brewer and Westhaver (Journal Physical Chemistry 34, 153, 1930), also found on page 20 in "The Electrochemistry of Gases and Other Dielectrics" by G. Glockler and S. C. Lind, John Wiley & Sons, Inc., 1939.

It will be understood, therefore, that the invention is not limited to the embodiments illustrated and described but contemplates such other embodiments as may occur to those skilled in the art.

We claim:

1. The method of producing and enhancing chemical reaction in flowable reactant material, which comprises causing the reactant material to flow as a fluid current along a defined flow path, establishing an electrical discharge having a field pattern axial to the direction of flow through the flowing material within the flow path, and passing the flowing reactant material as a whole in a unidirectional and continuous fluid current through a converging-diverging nozzle which converges from and is continuous with the walls of said flow path upstream of the nozzle and diverges to and is continuous with the walls of said flow path downstream from the nozzle, said converging-diverging nozzle being free throughout its entire converging-diverging length from obstruction and from discontinuities in the walls thereof which would modify the characteristic flow pattern of the nozzle constituting a part of said flow path, at least a portion of the electrical discharge overlapping a segment of said nozzle, thereby establishing in said flowing material those interrelated, controlled conditions of pressure, temperature and velocity which are characteristic of said unobstructed converging-diverging nozzle, said conditions being produced at a specific desired position within the discharge region whereby a desired reaction is enhanced and undesired reactions are suppressed.

2. The method of claim 1 in which the inversely related pressure and velocity characteristics are controlled to obtain a concomitant temperature characteristic as a function of pressure by means of the nozzle.

3. The method of claim 2 in which the electrical discharge established has a decreasing field intensity in the direction of flow of the reactant material.

4. The method of claim 1 in which the electrical discharge established has a decreasing field intensity in the direction of flow of the reactant material.

5. The method of claim 1 in which the field is electromagnetically induced.

6. In an apparatus for producing and enhancing chemical reaction in flowable reactant material, means including walls defining a flow path for said material, means adapted to establish an electrical discharge having a field pattern axial to the direction of flow within the flow path, and a converging-diverging nozzle constituting part of the flow path, said nozzle being continuous with and converging from the walls of said flow path upstream of the nozzle and being continuous with and diverging to the walls of said flow path downstream of the nozzle and being, throughout its entire converging-diverging length, free from obstruction and from discontinuities in the walls thereof which would modify the characteristic flow pattern of the nozzle and adapted to accommodate all of the flowable reactant material in a unidirectional and continuous fluid current, the means of establishing the electrical discharge being so arranged that at least a portion of the electrical discharge will overlap a segment of the nozzle, thereby establishing in said flowing material those interrelated, controlled conditions of pressure, temperature and velocity which are characteristic of said unobstructed converging-diverging nozzle, said conditions being produced at a specific desired position within the discharge region whereby a desired reaction is enhanced and undesired reactions are suppressed.

7. The apparatus of claim 6 in which the means for establishing an electrical discharge within the flow path is arranged so that decreasing field intensity will lie in the direction of flow of the reactant material.

8. The apparatus of claim 6 in which the means for establishing within the flow path an electrical discharge includes electrodes external of said flow path.

9. The apparatus of claim 8 in which the electrodes comprise a pair of ring electrodes spaced axially of the flow path and surrounding said flow path.

10. The apparatus of claim 8 in which electrodes comprise a "cold finger" electrode and a ring electrode spaced axially therefrom.

11. The apparatus of claim 6 in which the means for establishing an electrical discharge includes a resonant cavity.

References Cited in the file of this patent

UNITED STATES PATENTS

| | | |
|---|---|---|
| 1,233,926 | Serpek | July 17, 1917 |
| 2,185,070 | Stevens | Dec. 26, 1939 |
| 2,301,315 | Opp | Nov. 10, 1942 |
| 2,458,320 | Unschuld | Jan. 4, 1949 |
| 2,458,321 | Unschuld | Jan. 4, 1949 |
| 2,684,329 | Rouy | July 20, 1954 |

UNITED STATES PATENT OFFICE

CERTIFICATE OF CORRECTION

Patent No. 3,003,939                                                             October 10, 1961

Auguste L. M. A. Rouy et al.

It is hereby certified that error appears in the above numbered patent requiring correction and that the said Letters Patent should read as corrected below.

Column 1, line 50, insert the legend -- Time⟶ --; column 2, line 6, before "zone" insert -- reaction --; same column line 61, for "or" read -- of --; column 6, line 4, for "in", first occurrence, read -- is --; line 27, for "farorable" read -- favorable --; line 60, left-hand portion of the equations for "Po/P" read -- po/p= --; line 73, for "P=" read -- p= --.

Signed and sealed this 10th day of April 1962.

(SEAL)
Attest:

ERNEST W. SWIDER                                         DAVID L. LADD
Attesting Officer                                      Commissioner of Patent